United States Patent
Liu et al.

(10) Patent No.: US 11,323,951 B2
(45) Date of Patent: May 3, 2022

(54) INFORMATION TRANSMISSION METHOD AND DEVICE, STORAGE MEDIUM AND PROCESSOR

(71) Applicant: Xi'An Zhongxing New Software Co., Ltd., Xi'an (CN)

(72) Inventors: Xing Liu, Guangdong (CN); Feng Bi, Guangdong (CN); Junfeng Zhang, Guangdong (CN); Peng Hao, Guangdong (CN); Haigang He, Guangdong (CN)

(73) Assignee: XI'AN ZHONGXING NEW SOFTWARE CO., LTD., XI'An (CN)

( * ) Notice: Subject to any disclaimer, the term of this patent is extended or adjusted under 35 U.S.C. 154(b) by 123 days.

(21) Appl. No.: 16/622,861

(22) PCT Filed: Jun. 11, 2018

(86) PCT No.: PCT/CN2018/090709
§ 371 (c)(1),
(2) Date: May 18, 2020

(87) PCT Pub. No.: WO2018/228345
PCT Pub. Date: Dec. 20, 2018

(65) Prior Publication Data
US 2020/0288377 A1   Sep. 10, 2020

(30) Foreign Application Priority Data
Jun. 15, 2017 (CN) .......................... 201710453143.1

(51) Int. Cl.
*H04W 48/08* (2009.01)
*H04W 74/08* (2009.01)

(52) U.S. Cl.
CPC ....... *H04W 48/08* (2013.01); *H04W 74/0833* (2013.01)

(58) Field of Classification Search
None
See application file for complete search history.

(56) References Cited

U.S. PATENT DOCUMENTS 10,440,638 B2 * 10/2019 Jiang .................. H04W 48/14
10,455,621 B2 * 10/2019 Agiwal ................ H04W 72/14
2016/0234735 A1    8/2016 Kubota et al.

FOREIGN PATENT DOCUMENTS

| CN | 105472528 A | 4/2016 |
| CN | 106792998 A | 5/2017 |

(Continued)

OTHER PUBLICATIONS

International Search Report for Application No. PCT/CN2018/090709, dated Aug. 20, 2018, 4 pages.

(Continued)

*Primary Examiner* — Hong S Cho
(74) *Attorney, Agent, or Firm* — Foley & Lardner LLP (57) ABSTRACT

The present application provides an information transmission method and device, storage medium and processor. The method includes: a network side transmits request configuration information of other system information to a terminal, the request configuration information of the other system information including a transmission configuration for request information of the other system information, the request information of the other system information being information transmitted to the network side when the terminal requests to acquire the other system information; and the network side transmits the other system information on the downlink transmission port indicated by the request information of the other system information.

20 Claims, 6 Drawing Sheets

---

The network side transmits request configuration information of other system information to the terminal — S202

The network side transmits the other system information on a downlink transmission port indicated by the request information of the other system information — S204

(56) References Cited

FOREIGN PATENT DOCUMENTS

| CN | 108112022 A | 6/2018 |
|---|---|---|
| EP | 3358777 A1 | 8/2018 |
| WO | WO-2016130353 A2 | 8/2016 |
| WO | WO-2017071473 A1 | 5/2017 |

OTHER PUBLICATIONS

ZTE et al., "Consideration on the Other SI Delivery in NR", 3GPP TSG-RAN WG2 Meeting 395bis R2-166343, Sep. 30, 2016 (Sep. 30, 2016, section 2.

Extended European Search Report for Application No. 18818665.4, dated Feb. 11, 2021, 14 pages.

Qualcomm Incorporated, "PRACH design consideration", 3GPP Draft, R1-1706171, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017 Apr. 3, 2017 (Apr. 3, 2017), XP051252450, Retrieved from the Internet: URL:http://www.3gpp.org/ftp/tsg_ran/WG1_RL1/TSGR1_88b/Docs/[retrieved on Apr. 3, 2017] paragraphs [0002], [05.1].

Japanese Office Action for Application No. 2019-569911, dated Mar. 30, 2021, 10 pages including translation.

"Response LS on minimum system information", 3GPP TSG-RAN WG2 NR Ad Hoc R1-1701519, Jan. 16, 2017-Jan. 20, 2017, Spokane, USA, Retrieved from the Internet Mar. 18, 2021, <URL:https://www.3gpp.org/ftp/tsg_ran/WG1_RL1/TSGR1_AH/NR_AH_1701/Docs/R1-1701519.zip>, 1 paragraph.

ZTE, "Delivery of remaining minimum SI and other SI", 3GPP TSG RAN WG1 #89 R1-1707046, May 15, 2017-May 17, 2017, Hangzhou, China, Retrieved from the Internet Mar. 18, 2021, <URL:https://www.3gpp.org/ftp/tsg_ran/WG1_RL1/TSGR1_89/Docs/R1/1707046.zip>, Section 2, Section 3.

\* cited by examiner

INFORMATION TRANSMISSION METHOD AND DEVICE, STORAGE MEDIUM AND PROCESSOR

CROSS-REFERENCE TO RELATED APPLICATIONS

This is a national stage application, filed under 35 U.S.C. 371 of International Patent Application No. PCT/CN2018/090709, filed on Jun. 11, 2018, which claims priority to Chinese Patent Application No. 201710453143.1, filed on Jun. 15, 2017, the entirety of each of which is incorporated herein by reference.

TECHNICAL FIELD

The present disclosure relates to the field of communications and, in particular, to an information transmission method and device, storage medium and processor.

BACKGROUND

As the radio technology is advancing, various radio services have been emerged. However, the spectrum resources for these radio services are limited. When facing with increasing demands for bandwidth, spectrum resources between 300 MHz and 3 GHz mainly used for traditional commercial communications are extremely strained and may not satisfy requirements of future wireless communications.

The future wireless communications will use a carrier frequency (e.g., 28 GHz, 45 GHz) higher than the frequency used in a fourth generation (4G) communication system. This high frequency channel has disadvantages of large free propagation loss, easy absorption by oxygen, large attenuation caused by rain, etc., which seriously affects a coverage performance of a high-frequency communication system. In order to ensure a high-frequency communication and long-term evolution (LTE) system to have a similar signal-to-interference plus noise ratio (SINR) within a coverage area, an antenna gain of high frequency communications needs to be ensured. Fortunately, carrier frequencies for the high-frequency communications correspond to shorter wavelengths, this may ensure that more antenna elements may be accommodated per unit area; while more antenna elements may enhance the antenna gain through beamforming, thus the coverage performance of the high-frequency communications is guaranteed.

The beamforming allows a transmitting end to concentrate transmission energy to a certain direction, while energy in other directions is relatively small or none. That is to say, each beam has its own directivity, and each beam may only cover terminals on a certain direction. The transmitting end, i.e., a base station, needs to transmit multiple beams to achieve omnidirectional coverage. Typically, there are tens or even hundreds of beams. In order to satisfy access requirements that terminals may occur in all directions, an omnidirectional coverage of a system broadcast message must be realized, a communication station needs to repeatedly transmit a same system broadcast message in all beam directions. There also cause a large "absolute overhead" of the system broadcast message for the communication station.

In a new generation wireless communication system (new radio, NR), system information is divided into minimum system information (minimum SI) and other system information (other SI). The minimum system information is further divided into "main system information (MIB)" carried on a physical broadcast channel (PBCH) and "remaining minimum system information (RMSI)" carried on a physical downlink shared channel (PDSCH); the main system information is used to provide basic system parameters of a cell, and the remaining minimum system information is used to provide configuration information related to an initial access, such as, a transmission configuration of an initial access request and a receiving configuration of an initial access response message. Some other system information that needs to be broadcasted is called other system information. Different from an existing system (e.g. an LTE system), in order to achieve better forward compatibility and improve flexibility of resource scheduling, a new generation system needs to reduce transmission of always-on-line information as much as possible. Therefore, the minimum system information is broadcasted periodically, while the other system information is transmitted on demand.

However, it is still unknown how to request and transmit the other system information.

SUMMARY

Embodiments of the present application provide an information transmission method and device, storage medium and processor.

According to an aspect of the present application, an information transmission method is provided. The method includes steps described below. A network side transmits request configuration information of other system information to a terminal; where the request configuration information of the other system information includes a transmission configuration for request information of the other system information; the request information of the other system information is information transmitted to the network side, when the terminal requests to acquire the other system information; and the network side transmits the other system information on a downlink transmission port indicated by the request information of the other system information.

In some embodiments, the request configuration information of the other system information is configured through one of remaining minimum system information or a dedicated radio resource control (RRC) signaling.

In some embodiments, the request information of the other system information is a preamble sequence transmitted on at least one preamble resource predefined in a system; where the preamble resource includes at least one of a time domain resource, a frequency domain resource, or a code domain resource.

In some embodiments, the other system information is divided into at least one type; where one of the at least one preamble resource corresponds to one of the at least one type of the other system information.

In some embodiments, the method further includes a step described below. The network side identifies the downlink transmission port and a type of the other system information requested by the terminal in the request information of the other system information.

In some embodiments, the request configuration information of the other system information further includes at least one of: a transmission periodicity of each type of the other system information, a transmission time window of the other system information, a frequency domain position of the other system information, transmission resource information of the other system information, whether the other system information has been transmitted on a transmission resource, or a type of transmitted other system information.

In some embodiments, the step in which the network side transmits the other system information on the downlink transmission port indicated by the request information of the other system information includes a step described below. The network side transmits the other system information to the terminal according to the transmission periodicity of the other system information, the transmission time window of the other system information, and the frequency domain position of the other system information on the downlink transmission port indicated by the request information of the other system information.

In some embodiments, the request configuration information of the other system information further includes a receiving configuration of a random access response (RAR).

In some embodiments, the step in which the network side transmits the request configuration information of the other system information to the terminal includes a step described below. The network side transmits the other system information contained in the RAR.

In some embodiments, the RAR includes at least one of: a transmission periodicity of the other system information, a transmission time window of the other system information, a frequency domain position of the other system information, transmission resource information of the other system information, or a type of transmitted other system information.

In some embodiments, the method includes a step described below. The network side transmits the other system information according to the transmission periodicity of the other system information, the transmission time window of the other system information, and the frequency domain position of the other system information.

According to another aspect of the present application, an information transmission method is provided. The method includes steps described below. A terminal receives request configuration information of other system information transmitted by a network side; where the request configuration information of the other system information includes a transmission configuration for request information of the other system information; the request information of the other system information is information transmitted the network side, when the terminal requests to acquire the other system information; and the terminal receives the other system information transmitted by the network side on a downlink transmission port indicated by the request information of the other system information.

According to another aspect of the present application, an information transmission device is provided. The device is applied to a network side and includes a first transmitting module and a second transmitting module. The first transmitting module is configured to transmit request configuration information of other system information, where the request configuration information of the other system information includes a transmission configuration for request information of other system information; the request information of the other system information is information transmitted to the network side, when the terminal requests to acquire the other system information. The second transmitting module is configured to transmit the other system information at a downlink transmission port indicated by the request information of the other system information.

In some embodiments, the device further includes an identification module.

The identification module is configured to identify the downlink transmission port and a type of the other system information requested by the terminal in the request information of the other system information.

In some embodiments, the request configuration information of the other system information further includes at least one of: a transmission periodicity of each type of the other system information, a transmission time window of the other system information, a frequency domain position of the other system information, transmission resource information of the other system information, whether the other system information has been transmitted on a transmission resource, or a type of transmitted other system information.

In some embodiments, the second transmitting module is further configured to transmit the other system information to the terminal according to the transmission periodicity of the other system information, the transmission time window of the other system information, and the frequency domain position of the other system information on the downlink transmission port indicated by the request information of the other system information.

In some embodiments, the request configuration information of the other system information further includes a receiving configuration of a RAR.

In some embodiments, the second transmitting module is further configured to transmit the other system information contained in the RAR.

In some embodiments, the random access response includes at least one of: a transmission periodicity of the other system information, a transmission time window of the other system information, a frequency domain position of the other system information, transmission resource information of the other system information, or a type of transmitted other system information.

In some embodiments, the second transmitting module is further configured to transmit the other system information according to the transmission periodicity of the other system information, the transmission time window of the other system information, and the frequency domain position of the other system information.

According to another aspect of the present application, an information transmission device is provided. The device is applied to a terminal side and includes a first receiving module and a second receiving module. The first receiving module is configured to receive request configuration information of other system information transmitted by a network side; where the request configuration information of the other system information includes a transmission configuration for request information of the other system information; the request information of the other system information is information transmitted to the network side, when the terminal requests to acquire the other system information. The second receiving module is configured to receive the other system information transmitted by the network side on a downlink transmission port indicated by the request information of the other system information.

According to another embodiment of the present application, a storage medium is further provided. The storage medium includes a stored program. When the program is executed, the program performs any one of the above methods.

According to another embodiment of the present application, a processor is further provided. The processor is configured to execute a program. When the program is executed, the program performs any one of the above methods.

Through the present application, the network side transmits the request configuration information of the other system information to the terminal; where the request configuration information of the other system information includes the transmission configuration for the request information of the other system information; the request information of other system information is information transmitted to the network side, when the terminal requests to acquire the other system information, then the network side transmits the other system information on the downlink transmission port indicated by the request information of the other system information. It may be seen that through the above steps, the network side can effectively transmit the other system information to the terminal side, so that gaps can be filled up and other system information can be transmitted.

BRIEF DESCRIPTION OF DRAWINGS

Drawings described herein are used to provide further understanding of the present application and form a part of the present application, illustrative embodiments of the present application and the description thereof are used to explain the present application and do not constitute an improper limitation of the present application. In the drawings.

DETAILED DESCRIPTION

Hereinafter, the present application will be described in detail with reference to the drawings and embodiments. It should be noted that the embodiments in this application and features in the embodiments may be combined with each other without conflict.

It should be noted that terms of "first", "second" and so on in the description, claims, and drawings are used to distinguish similar objects, which are not necessarily used to describe a specific order or sequence.

Figure 1:
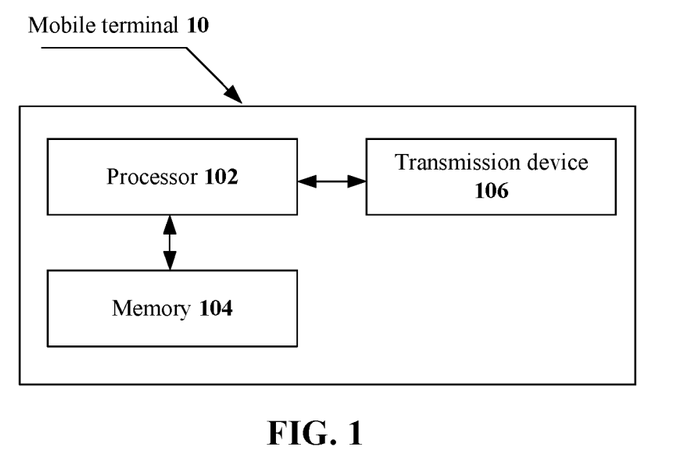
FIG. 1 is a hardware block diagram of a mobile terminal for an information transmission method according to an embodiment of the present application.

Method embodiments provided in embodiment one of the present application may be executed on at least one of a mobile terminal, a computer terminal or a similar computing device. Operating on a mobile terminal is taken as an example, FIG. 1 is a hardware block diagram of a mobile terminal for an information transmission method according to an embodiment of the present application. As shown in FIG. 1, the mobile terminal 10 may include at least one (only one is shown in FIG. 1) processor 102 (the processor 102 may include, but is not limited to, a processing device, such as a microprogrammed control unit (MCU) or a field programmable gate array (FPGA)), a memory 104 for storing data, and a transmission device 106 for communication functions. One of ordinary skill in the art may understand that the structure shown in FIG. 1 is only schematic and does not limit structures of the above electronic devices. For example, the mobile terminal 10 may also include more or fewer components than shown in FIG. 1, or may have a different configuration as shown in FIG. 1.

The memory 104 may be used to store software programs and modules of application software, such as, program instructions/modules corresponding to the information transmission method in the embodiments of the present application, the processor 102 executes various functional applications and data processing by performing software programs and modules stored in the memory 104, i.e., to implement the above methods. The memory 104 may include a high-speed random access memory and also a non-volatile memory, such as, at least one magnetic storage device, flash memory, or other non-volatile solid-state memory. In some embodiments, the memory 104 may further include a memory remotely disposed with respect to the processor 102, which may be connected to the mobile terminal 10 through a network. Examples of the above network include, but are not limited to, the Internet, an intranet, a local area network, a mobile communication network, and combinations thereof.

The transmission device 106 is used to receive or transmit data via a network. Specific examples of the network described above may include a wireless network provided by a communication provider of the mobile terminal 10. In an embodiment, the transmission device 106 includes a network interface controller (NIC), which may be connected to other network devices through a base station, so as to communicate with the Internet. In an embodiment, the transmission device 106 may be a radio frequency (RF) module, which is used to wirelessly communicate with the Internet.

Figure 2:
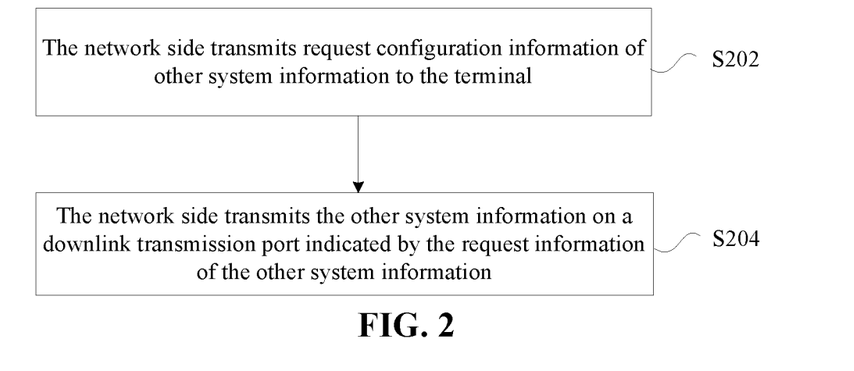
FIG. 2 is flowchart one of an information transmission method according to an embodiment of the present application.

The present embodiment provides an information transmission method operating on the network architecture. FIG. 2 is flowchart one of an information transmission method according to an embodiment of the present application. As shown in FIG. 2, the flow includes steps described below.

Step 202, the network side transmits request configuration information of other system information to the terminal; where, the request configuration information of the other system information includes a transmission configuration for request information of the other system information; the request information of the other system information is information transmitted to the network side, when the terminal requests to acquire the other system information.

Step 204, the network side transmits the other system information on a downlink transmission port indicated by the request information of the other system information.

Through the above step S202 to S204, the network side transmits the request configuration information of the other system information to the terminal; where, the request configuration information of the other system information includes the transmission configuration for the request information of the other system information; the request information of other system information is the information transmitted to the network side, when the terminal requests to acquire other system information, and then the network side transmits the other system information on the downlink transmission port indicated by the request information of other system information. It may be seen through the above steps that the network side can effectively transmit the other system information to the terminal side, so that gaps can be filled up and other system information can be transmitted.

In some embodiments, the network side, as an execution subject of the above steps, may be a base station or other network element, but is not limited thereto.

In some embodiments, an execution sequence of step S202 and step S204 may be interchangeable, that is, step S204 may be executed first, then step S202 is executed.

It should be noted that, the request configuration information of the other system information involved in the present embodiment is configured through one of remaining minimum system information or a dedicated radio resource control (RRC) signaling.

Furthermore, the request information of the other system information is a preamble sequence transmitted on at least one preamble resource predefined in a system; where the preamble resource includes at least one of a time domain resource, a frequency domain resource, or a code domain resource. Therefore, when the other system information is divided into at least one type, one of the at least one preamble resource corresponds to one of the at least one type of the other system information.

In some embodiments, the present embodiment further includes a step described below.

Step 206, the network side identifies the downlink transmission port and a type of the other system information requested by the terminal in the request information of the other system information.

Besides, in another alternative embodiment of the present embodiment, the request configuration information of the other system information involved in the present embodiment further includes at least one of: a transmission periodicity of each type of the other system information, a transmission time window of the other system information, a frequency domain position of the other system information, transmission resource information of the other system information, whether the other system information has been transmitted on a transmission resource, or a type of transmitted other system information.

Based on the above request configuration information of the other system information, the step 204 in which the network side transmits the other system information on the downlink transmission port indicated by the request information of the other system information according to the present embodiment in a specific application scene may include a following step: the network side transmits the other system information to the terminal according to the transmission periodicity of the other system information, the transmission time window of the other system information and the frequency domain position of the other system information on the downlink transmission port indicated by the request information of the other system information.

According to another alternative embodiment of the present embodiment, the request configuration of other system information involved in the preset embodiment further includes a receiving configuration of a random access response (RAR). Based on that, the step 202 in which the network side transmits the request configuration information of other system information according to the preset embodiment in a specific application scene may include a step described below. The network side transmits the other system information contained in the RAR.

The random access response includes at least one of: a transmission periodicity of the other system information, a transmission time window of the other system information, a frequency domain position of the other system information, transmission resource information of the other system information, or a type of transmitted other system information.

Based on the above random access response, the method of the present embodiment may further include a step described below. The network side transmits the other system information according to the transmission periodicity of the other system information, the transmission time window of the other system information, and the frequency domain position of the other system information.

In this embodiment, request preamble transmission configuration of the other system information (other SI) is indicated in RMSI; after configuration information in the RMSI is received by the terminal, the terminal transmits a preamble corresponding to the other SI expected to be acquired; then the RAR is received to acquire the requested other SI in the RAR.

In this embodiment, following process steps are included.

Step S1: gNB transmits request configuration information of other system information to UE1.

Step S2: UE1 feeds back a preamble to gNB.

Step S3: gNB transmits a RAR carrying the other system information to UE1.

Figure 3:
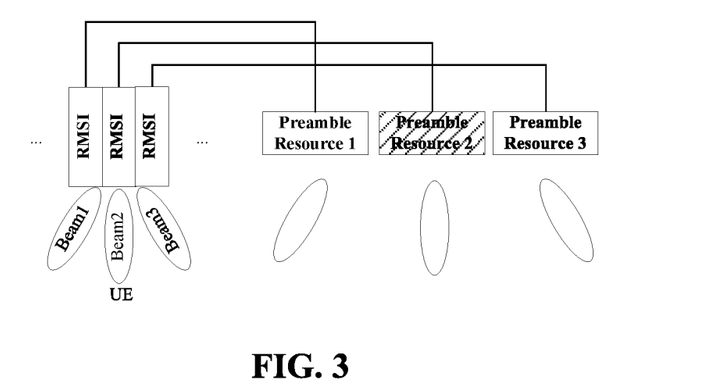
FIG. 3 is schematic diagram one of a transmission configuration for request configuration information of other system information containing a preamble according to an embodiment of the present application.

The above-mentioned steps S1 to S3 are described in detail as follows: gNB indicates the request configuration information of the other SI to the terminal through the RMSI; in this embodiment, the terminal needs to request the other SI from the base station by transmitting a random access request preamble sequence; therefore, the request configuration information of the other SI includes a transmission configuration of the preamble, FIG. 3 is a schematic diagram of a transmission configuration for the request configuration information of the other SI containing a preamble according to an embodiment of the present application, as shown in FIG. 3, since high-band RMSI needs to be transmitted in a beam mode, that is, to complete a full coverage of an expected coverage range, the RMSI needs to be transmitted in different beam directions, when the terminal requests the other system information, it needs to indicate to the base station that the terminal is located on which downlink transmission beam (or port), so that the base station may transmit the other system information in a beam direction (or port) where the terminal is located. In this embodiment, it is assumed that reciprocity on both sides of the terminal and the base station exists, a downlink transmission port of the RMSI only corresponds to one preamble time-frequency domain resource, that is, the terminal transmits the preamble on the preamble time-frequency domain resource corresponding to the RMSI, then the base station may determine a downlink beam (or port) where the terminal is currently located. For example, the terminal receives the RMSI on beam 2, so the terminal will learn that a preamble resource corresponding to the RMSI is preamble resource 2 according to the RMSI configuration in beam 2, and the terminal will transmit the preamble on preamble resource 2. Correspondingly, when the base station receives the preamble on preamble resource 2, so it is determined that UE under beam 2 needs the other SI, the base station will transmit the other SI on beam 2 afterwards.

In addition, the other SI is divided into two types beforehand by the system: for example, SI related to neighbor cell measurements is the first type of the other SI; remaining other system information is the second type of the other SI. And two preamble sequence resources are predefined to be specially used for an application of the other SI: sequence 1 corresponds to the first type of the other SI, while sequence 2 corresponds to the second type of the other SI. At this time, when the terminal needs to request the other system information related to neighbor cell measurements, the terminal will choose to transmit the sequence 1.

Figure 4:
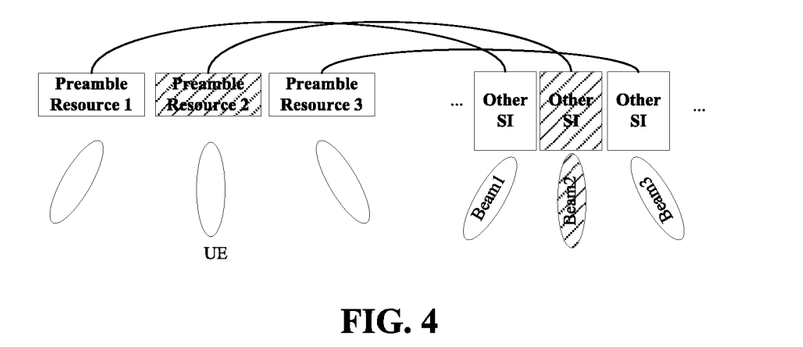
FIG. 4 is a schematic diagram of other system information carried on a RAR according to an embodiment of the present application.

Further, FIG. 4 is a schematic diagram of other system information carried on a RAR according to an embodiment of the present application. As shown in FIG. 4, if the base station receives request dedicated preamble sequence 1 of the other SI transmitted by the terminal on preamble resource 2, the base station will determine that the other SI related to neighbor cell measurements is contained only in the RAR corresponding to beam 2.

The terminal transmitting the request information of the other SI receives the RAR according to a receiving configuration of the RAR configured by the network side, and acquires desired other SI in the RAR.

When the terminal receives the RAR, downlink control information (DCI) is blindly detected using a random access radio network temporary identity (RA-RNTI) in a search space of a physical downlink control channel (PDCCH) within a slot corresponding to the RAR, and scheduling information of random access response information is acquired in the DCI, the random access response information is received according to the scheduling information, so as to acquire other SI contained in the random access response information.

Figure 5:
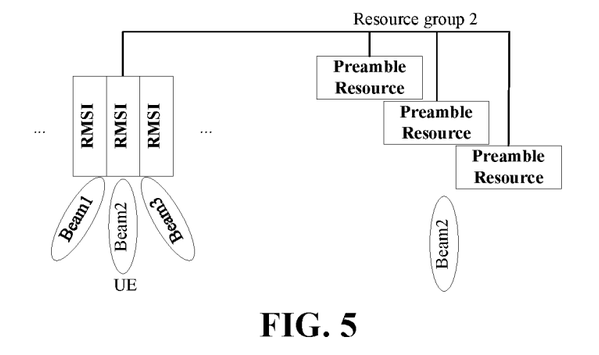
FIG. 5 is schematic diagram two of a transmission configuration for request configuration information of other system information containing a preamble according to an embodiment of the present application.

FIG. 5 is schematic diagram two of a transmission configuration for request configuration information of other system information containing a preamble according to an embodiment of the present application. As shown in FIG. 5, there is a case where reciprocity on the base station side does not exist while reciprocity on the UE side exists, that is, a downlink transmission port (beam) on the base station side may not uniquely correspond to an uplink receiving port (beam) on the base station side, while a downlink receiving port (beam) on the terminal side uniquely corresponds to an uplink transmission port (beam). At this time, there will be multiple preamble transmission time-frequency resources corresponding to downlink transmission beam 2, so that the base station may receive preamble transmission of the terminal using different receiving ports. That is, the base station switches the receiving port (beam direction) on multiple preamble transmission time-frequency resources, and the transmission port (beam) of the terminal keeps unchanged, that is, sweeping of the receiving port is performed on the base station side.

There is a case where the reciprocity on the UE side does not exist while the reciprocity on the base station side exists, that is, the downlink receiving port (beam) on the terminal side may not uniquely correspond to the uplink transmission port (beam), while the downlink transmission port (beam) on the base station side uniquely corresponds to the uplink receiving port (beam) on the base station side. At this time, when the UE transmits the preamble, which needs to repeatedly transmit the preamble through multiple uplink transmission ports (beams) to ensure that the base station side may receive the preamble. In this case, it is also necessary to define multiple corresponding preamble transmission time-frequency resources for one downlink transmission port (beam), the terminal will change the transmission port (beam) in different preamble transmission time-frequency resources, while the receiving port (beam) on the base station side keeps unchanged, i.e., sweeping of the transmission port is performed on the terminal side.

There is another case where the reciprocity on both sides of the UE and the base station does not exist, at this time, more preamble transmission time-frequency resources and one downlink transmission port (beam) need to be defined, i.e. joint sweeping of the transmission port (beam) on the terminal side and the receiving port (beam) on the base station will be completed according to a certain rule, for example, sweeping of the receiving port on the base station side will be performed first, i.e. the receiving port (beam) on the base station side will be switched on multiple consecutive preamble resources, and the terminal will keep the transmission port (beam) unchanged; after the receiving port on the base station is polled once, the terminal switches to another transmission port (beam), and the base station polls to receive; the above steps are repeated to complete any combination transmission of all transmission ports on the terminal side and receiving ports on the base station side.

It should be noted that under the above-mentioned circumstances, a defined group of preamble transmission time-frequency resources corresponds to one certain downlink transmitting port, that is, the base station may determine the downlink transmission port (beam direction) where the UE is located, when the base station receives the request preamble of the other SI transmitted by the terminal on any one of these resources. And the base station transmits the other SI on this corresponding port.

In this embodiment, the RMSI or RRC dedicated signaling indicates the transmission configuration for the request information of the other SI, as well as a periodicity of the other SI, a transmission time window of the other SI, and a frequency domain position of each type of the other SI; after the configuration information in RMSI is acquired by the terminal, the terminal transmits the preamble corresponding to the other SI expected to be acquired. The PDCCH is blindly detected within a designated time window.

In a specific embodiment, following method steps are included.

Step S1: gNB transmits request configuration information of other system information to UE1.

Step S2: UE1 feeds back a preamble to gNB;

Step S3: gNB transmits a PDSCH carrying the other system information to UE1.

For steps S1 to S3 in this specific embodiment, the base station gNB transmits the request configuration information of the other SI to the terminal; the request configuration information of the other SI includes the transmission configuration of the other SI request information, as well as the transmission periodicity of the other SI, the time window of the other SI, and the frequency domain position of the other SI, where the request configuration information of the other SI refers to information transmitted to the network side, when the terminal requests to acquire the other system information.

Specifically, gNB indicates the request configuration information of the other system information (other SI) to the terminal through the RMSI; in this embodiment, the terminal needs to request the other SI from the base station by transmitting a random access request preamble; therefore, the request configuration information of the other SI includes the transmission configuration of the preamble, as shown in FIG. 3, since the high-band RMSI needs to be transmitted in the beam mode, that is, to complete the full coverage of the expected coverage, the RMSI needs to be transmitted in different beam directions, when the other system information is requested, the terminal needs to indicate to the base station that the terminal is located on which downlink transmission beam (or port), so that the base station may transmit the other system information in the beam direction (or port) where the terminal is located. In this embodiment, it is assumed that the reciprocity on both sides of the terminal and the base station exists, the downlink transmission port of the RMSI only corresponds to one preamble time-frequency domain resource, that is, the terminal transmits the preamble on the preamble time-frequency domain resource corresponding to the RMSI, and the base station may determine the downlink beam (or port) where the terminal is currently located. For example, when the terminal receives the RMSI on beam 2, it will know that the corresponding preamble resource is preamble resource 2 according to the RMSI configuration in beam 2, and the terminal will transmit the preamble on preamble resource 2. Correspondingly, when the base station receives the preamble on preamble resource 2, it is determined that UE under beam 2 needs the other SI, and the base station will transmit the other SI on beam 2 afterwards.

In addition, the other SI is divided into various types beforehand by the system: each type of the other system information corresponds to a dedicated preamble sequence, the division manner of the above-mentioned other system information, and the corresponding relationship between different types of the other system information and dedicated preamble sequences are known by the terminal and the base station. At this time, if the terminal needs to request a certain type of the other system information, the terminal will choose to transmit the preamble sequence corresponding to this type of the other system information.

Figure 6:
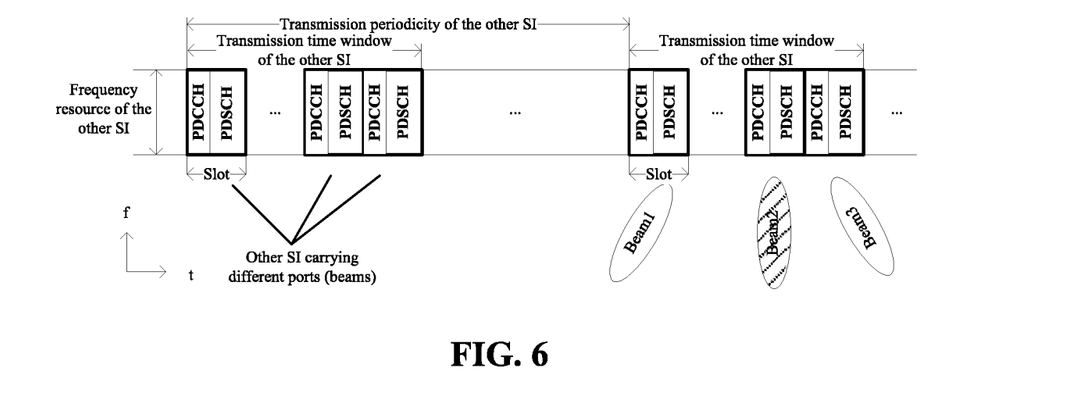
FIG. 6 is a schematic diagram of other system information carried on a physical downlink shared channel according to an embodiment of the present application.

Further, FIG. 6 is a schematic diagram of other system information carried on a physical downlink shared channel according to an embodiment of the present application, as shown in FIG. 6, when a subordinate terminal has acquisition requirements on the other SI, the base station will transmit the other SI within a fixed transmission time window according to a predefined periodicity of the other SI; the transmission time window of the other SI contains at least one slot.

According to the transmission periodicity (for example, the transmission periodicity is 160 ms) of the other SI, the terminal transmits a time window of the other SI (the transmission time window may have a wireless frame level, for example, the transmission time window is represented by a system frame number (SFN): SFN mod 16=1 or 2, which indicates that two consecutive wireless frames with modulo 16 of the system frame number being 1 or 2 are one transmission time window; further, the transmission time window may also have sub-frame granularity, and it is necessary to further indicate a sub-frame contained in the transmission time window based on the system frame number), and the frequency domain position of the other SI acquired in the RMSI, the terminal blindly detects downlink control information at a designated frequency domain position within each slot in the transmission time window using a system information radio network temporary identity (SI-RNTI) on a PDCCH, to determine whether the PDSCH in the each slot carries the other SI requested by the terminal. The terminal will acquire the other SI within a certain slot in the transmission time window of the other SI.

When there are terminals requesting the other SI on multiple downlink transmission ports (beams), the base station will transmit the other SI on the multiple downlink transmission ports (beams) with transmission requirements of the other SI, the base station may flexibly determine using which slot to transmit other SI of which port (beam). In addition, types of other SI requested by different terminals may be different, and types of other SI carried in slots corresponding to different ports (beams) may also be different.

In this embodiment, it is assumed that the reciprocity on both sides of the terminal and the base station exists, which is similar to embodiment two, when the reciprocity on at least one side does not exist, more preamble resources will be configured to correspond to the downlink transmission port (beam) to complete sweeping of the transmission port (beam) on the at least one side.

In this embodiment, the RMSI or RRC dedicated signaling indicates the transmission configuration for the request information of the other SI, as well as a periodicity of the other SI, transmission time window of the other SI, and frequency domain position of various types of the other SI; after the configuration information in the RMSI is acquired by the terminal, the terminal transmits the preamble corresponding to the other SI expected to be acquired. The PDCCH is blindly detected within a designated time window.

Figure 7:
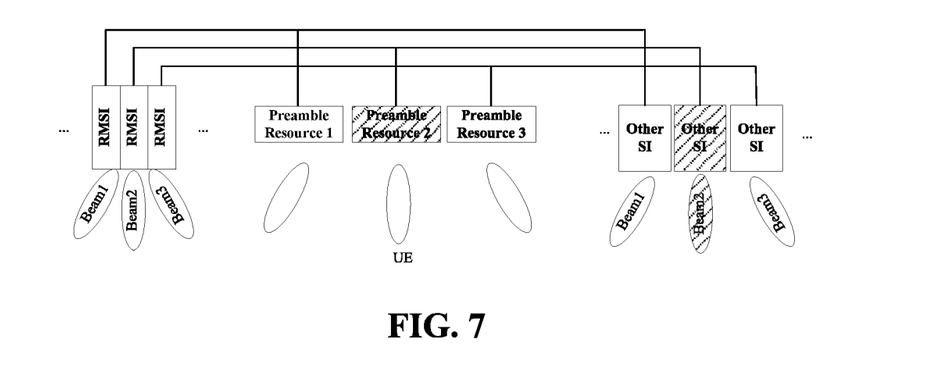
FIG. 7 is schematic diagram three of a transmission configuration for request configuration information of other system information containing a preamble according to an embodiment of the present application.

Difference from the above embodiment is that the request configuration information of the other SI transmitted by the base station gNB to the terminal includes the transmission configuration for the request information of the other system information and the transmission resource configuration information of the other SI (e.g., a frequency domain position, specific slot information in time domain). FIG. 7 is schematic diagram three of a transmission configuration for request configuration information of other system information containing a preamble according to the embodiment of the present application, as shown in FIG. 7, a preamble resource corresponding to a downlink port (beam) where the RMSI is located and a transmission resource of subsequent other SI are directly configured in the RMSI. At this time, the terminal does not need to blindly detect the DCI within each slot of the transmission time window to determine whether the other SI is included, it only needs to directly and blindly detect the DCI within a designated slot, scheduling information of the other SI in the PDSCH is acquired from the DCI, and the other SI is received according to the scheduling information.

It should be noted that, in this way, the transmission resource of the other SI notified in the RMSI is only a pre-configured resource, when a corresponding terminal requests the other SI, the requested other SI is transmitted using the pre-configured resource; if no terminal requests the other SI on some downlink ports (beams), the pre-configured resource of the other SI will be used to transmit other information without reservation.

In this embodiment, the RMSI or RRC dedicated signaling indicates the transmission configuration for the request information of the other SI and the transmission resource configuration information of the other SI; after the configuration information in the RMSI is acquired, the terminal transmits the preamble corresponding to the other SI expected to be acquired. Blind detection of downlink control information is performed on a designated other SI transmission resource.

In this embodiment, following method steps are included.

Step S1: gNB transmits request configuration information of other system information to UE1;

Step S2: UE1 feeds back a preamble to gNB;

Step S3: gNB transmits a RAR to UE1.

Step S4: gNB transmits a PDSCH carrying other system information to UE1.

For the above steps S1 to S4, the specific process may include: the base station gNB transmits the request configuration information of the other SI to the terminal; where, the request configuration information of the other SI includes a transmission configuration for the request information of the other system information and a receiving configuration of a random access response, where the request information of the other system information refers to information transmitted to the network side when the terminal requests to acquire the other system information.

Specifically, gNB indicates the request configuration information of the other SI to the terminal through the RMSI; in this embodiment, the terminal needs to request the other SI from the base station by transmitting a random access request preamble; therefore, the request configuration information of the other SI includes the transmission configuration of the preamble, as shown in FIG. 3, since the high-band RMSI needs to be transmitted in the beam mode, that is, to complete the full coverage of the expected coverage, the RMSI needs to be transmitted in different beam directions, when the other system information is requested by the terminal, the terminal needs to indicate to the base station that the terminal is located on which downlink transmission beam (or port), so that the base station may transmit the other system information in a beam direction (or port) where the terminal is located. In this embodiment, it is assumed that the reciprocity on both sides of the terminal and the base station exists, the downlink transmission port of the RMSI only corresponds to one preamble time-frequency domain resource, that is, the terminal transmits the preamble on the preamble time-frequency domain resource corresponding to the RMSI, and the base station may determine the downlink beam (or port) where the terminal is currently located. For example, when the terminal receives the RMSI on beam 2, it will know that the corresponding preamble resource is preamble resource 2 according to the RMSI configuration in beam 2, and the terminal will transmit the preamble on preamble resource 2. Correspondingly, when the base station receives the preamble on preamble resource 2, it is determined that UE under beam 2 needs the other SI, and the base station will transmit the other SI on beam 2 afterwards.

In addition, the other SI is divided into various types by the system in advance: each type of other system information corresponds to a dedicated preamble sequence, the division mode of the above-mentioned other system information, and the corresponding relationship between different types of other system information and dedicated preamble sequences are known by the terminal and the base station. At this time, if the terminal requests a certain type of other system information, the terminal will choose to transmit a preamble sequence corresponding to this type of the other system information.

The base station determines which other SI needs to be transmitted on which downlink transmission port (beam) according to a received preamble sequence. At this time, the base station may further determine a resource for transmission of these other SI, including the transmission periodicity of the other SI, time window of the other SI and frequency domain position of the other SI, these information is included in a RAR and fed back to the terminal. And the other SI is transmitted according to the above resource configuration of the other SI.

The terminal transmitting the request of the other SI receives the RAR first, then determines the resource configuration of the other SI. Further, in this embodiment, the other system information is carried on a physical downlink shared channel; specifically, the transmission time window of the other SI includes one or more slot terminals, according to the transmission periodicity of the other SI, time window of the other SI, and frequency domain position of the other SI acquired in the RAR, the terminal blindly detects the DCI on a PDCCH within each slot of a designated frequency domain position and transmission time window using an SI-RNTI, to determine whether the PDSCH in the each slot carries the other SI requested by the terminal. The terminal will acquire the other SI in a certain slot within the transmission time window of the other SI.

When there are terminals requesting the other SI on multiple downlink transmission ports (beams), the base station will transmit the other SI on the multiple downlink transmission ports (beams) with transmission requirements of the other SI, the base station may flexibly determine using which slot to transmit the other SI on which port (beam). In addition, types of other SI requested by different terminals may be different, and types of other SI carried on the slot corresponding to different ports (beams) may also be different.

In this embodiment, it is assumed that the reciprocity on the terminal and the base station side exists, which is similar to the above embodiments, when the reciprocity on at least one side does not exists, more preamble resources will be configured to correspond to the downlink transmission port (beam) to complete sweeping of the transmission port (beam) on the at least one side.

In this embodiment, the request preamble transmission configuration of the other SI is indicated in the RMSI; after the terminal acquires the configuration information in the RMSI, the terminal transmits the preamble corresponding to the other SI expected to be acquired. The RAR is received, periodicitys of different kinds of other SI, transmission time windows of different kinds of other SI and frequency domain position of different kinds of other SI are acquired in the RAR; the PDCCH is blindly detected within a designated time window.

In this embodiment, following method steps are included.

Step S1: gNB transmits request configuration information of other system information to UE1;

Step S2: UE1 feeds back a preamble to gNB;

Step S3: gNB transmits a RAR to UE1.

Step S4: gNB transmits a PDSCH carrying other system information to UE1.

For the above steps S1 to S4, the base station gNB transmits the request configuration information of the other SI to the terminal; the request configuration information of the other SI includes the transmission configuration for request information of the other system information and a receiving configuration of a random access response, where the request information of other system information refers to information transmitted to the network side when the terminal requests to acquire other system information.

Specifically, gNB indicates the request configuration information of the other SI to the terminal through the RMSI; in this embodiment, the terminal needs to request the other SI from the base station by transmitting a random access request preamble; therefore, the request configuration information of the other SI includes the transmission configuration of the preamble, as shown in FIG. 3, since the high-band RMSI needs to be transmitted in the beam mode, that is, to complete the full coverage of the expected coverage, the RMSI needs to be transmitted in different beam directions, when the other system information is requested by the terminal, the terminal needs to indicate to the base station that the terminal is located on which downlink transmission beam (or port), so that the base station may transmit the other system information in the beam direction (or port) where the terminal is located. In this embodiment, it is assumed that the reciprocity on both sides of the terminal and the base station exists, the downlink transmission port of the RMSI only corresponds to one preamble time-frequency domain resource, that is, the terminal transmits the preamble on the preamble time-frequency domain resource corresponding to the RMSI, and the base station may determine the downlink beam (or port) where the terminal is currently located. For example, when the terminal receives the RMSI on beam 2, the terminal will know that the preamble resource corresponding to the RMSI is preamble resource 2 according to the RMSI configuration in beam 2, and the terminal will transmit the preamble on preamble resource 2. Correspondingly, when the base station receives the preamble on preamble resource 2, it is determined that UE under beam 2 needs the other SI, and the base station will transmit the other SI on beam 2 afterwards.

In addition, the other SI is divided into various types by the system in advance: each type of the other system information corresponds to a dedicated preamble sequence, the division manner of the above-mentioned other system information, and the corresponding relationship between different types of the other system information and dedicated preamble sequences are known by the terminal and the base station. At this time, if the terminal requests a certain type of the other system information, the terminal will choose to transmit the preamble sequence corresponding to this type of the other system information.

The base station determines which other SI needs to be transmitted on which downlink transmission port (beam) according to a received preamble sequence. At this time, the base station may further determine a resource for transmission of the other SI, including the transmission periodicity of the other SI, the time window of the other SI and the frequency domain position of the other SI, these kinds of information are included in the RAR and fed back to the terminal. And the other SI is transmitted according to the above resource configuration of the other SI.

The terminal transmitting the request of the other SI receives the RAR first, then determines the resource configuration of the other SI. Further, in this embodiment, the other system information is carried on a physical downlink shared channel; specifically, the transmission time window of the other SI includes at least one slot terminal. According to the transmission periodicity of the other SI, the time window of the other SI, and the frequency domain position of the other SI acquired in the RAR, the terminal blindly detects the DCI within each slot in transmission time window at a designated frequency domain position using an SI-RNTI, to determine whether the PDSCH in the each slot carries the other SI requested by the terminal. The terminal will acquire the other SI in a certain slot within the transmission time window of the other SI.

When there are terminals requesting the other SI on multiple downlink transmission ports (beams), the base station will transmit the other SI on the multiple downlink transmission ports (beams) with transmission requirements of the other SI, the base station may flexibly determine using which slot to transmit other SI of which port (beam). In addition, types of other SI requested by different terminals may be different, and types of other SI carried in slots corresponding to different ports (beams) may also be different.

In this embodiment, it is assumed that the reciprocity on both sides of the terminal and the base station exists, which is similar to the above embodiments, when the reciprocity on at least one side does not exists, more preamble resources will be configured to correspond to the downlink transmission port (beam) to complete sweeping of the transmission port (beam) on the at least one side.

In this embodiment, the RMSI indicates the request preamble transmission configuration of the other SI; after acquiring the configuration information in the RMSI, the terminal transmits the preamble corresponding to the other SI expected to be acquired. The RAR is received and transmission resource configuration information of the other SI is acquired in the RAR; the downlink control information is blindly detected on a designated other SI transmission resource.

This embodiment has a same flow with the above embodiments, except that the base station directly indicates the transmission resource configuration information of the other SI in the RAR, that is, a specific transmission resource for subsequent other SI. At this time, the terminal does not need to blindly detect the downlink control information in each slot within the transmission time window to determine whether the other SI is included, but it directly goes to a designated slot for blind detection of the DCI, scheduling information of the other SI in the PDSCH is acquired in the DCI, then the other SI is received according to the scheduling information.

It should be noted that the request configuration information of the other SI is configured through RMSI, or it may be configured through dedicated RRC information.

In this embodiment, there are three coexisting mechanisms described as follows, the terminal determines an acquisition manner of the other SI through reception of the request configuration information of the other SI.

Manner one: the request configuration information of the other SI includes a transmission configuration for the request information of other system information (a preamble transmission configuration), a transmission periodicity of the other SI, a time window of the other SI, a frequency domain position of the other SI and other information of the other SI; after the terminal learns the request configuration information of the other SI, a preamble is transmitted according to the preamble transmission configuration to indicate the downlink transmission beam and a type of the other SI to be acquired to the base station, and it needs to remove the DCI used for blind detection of the other SI on the PDCCH within each slot in the transmission time window of the other SI by default, the other SI carried in the PDSCH is received according to the scheduling information of the other SI carried in the DCI.

Manner two: when the request configuration information of the other SI does not include the transmission periodicity of the other SI, the time window of the other SI, the frequency domain position of the other SI and other information of the other SI, but it includes the transmission configuration for the request information of the other SI and a receiving configuration of the RAR; then the terminal receives the RAR according to the receiving configuration of the RAR by default and further the scheduling information of the other SI is acquired; at this time, the scheduling information of the other SI included in the RAR may be information such as the transmission periodicity of the other SI, the time window of the other SI, and the frequency domain position of the other SI; or specific scheduling information of the other SI (i.e. it is specific to the slot that the other SI is carried on). If it is the former, the terminal still needs to remove the DCI used for the blind detection of the other SI on the PDCCH within each slot in the transmission time window of the other SI, and the other SI carried on the PDSCH is received according to the scheduling information of the other SI in the DCI; if the scheduling information of the other SI in the RAR is the specific scheduling information of the other SI, the terminal directly goes to a slot indicated by the scheduling information to blind detect the DCI on the PDCCH and receives the other SI carried on the PDSCH according to the scheduling information of the other SI carried in the DCI.

Manner three: when the request configuration information of the other system information (other SI) includes the transmission configuration for the request information of the other SI, the transmission periodicity of the other SI, the time window of the other SI, the frequency domain position of the other SI and other information of the other SI, as well as the receiving configuration of the RAR; at this time, after the terminal transmits the preamble according to the transmission configuration for the request information of the other SI, there are two options: option 1, the DCI is blindly detected on the PDCCH within each slot in the transmission time window of the other SI, and the other SI carried on the PDSCH is received according to the scheduling information of the other SI carried in the DCI; option 2: it may attempt to receive the RAR, if the RAR with the specific scheduling information is received, blind detection of multiple slots in the time window may be avoided, and the DCI in the slot indicated by the scheduling information is directly blindly detected on the PDCCH, and the other SI carried on the PDSCH is received according to the scheduling information of the other SI carried in the DCI. If the RAR is not received, the blind detection of multiple slots in the time window may be performed according to option 1.

Figure 8:
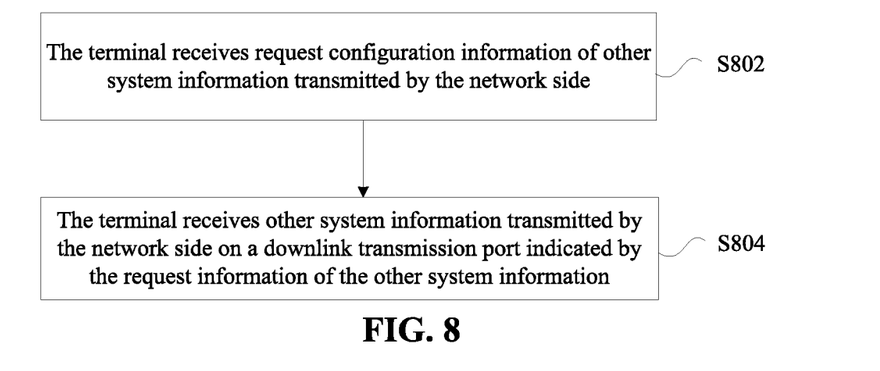
FIG. 8 is flowchart two of an information transmission method according to an embodiment of the present application.

It should be noted that this embodiment further provides an information transmission method, FIG. 8 is flowchart two of an information transmission method according to an embodiment of this application, the method includes steps described below.

Step S802: the terminal receives request configuration information of other system information transmitted by the network side; where the request configuration information of other system information includes a transmission configuration for the request information of the other system information; the request information of other system information is information transmitted to the network side when the terminal requests to acquire the other system information.

Step S804: the terminal receives other system information transmitted by the network side on a downlink transmission port indicated by the request information of the other system information.

In this embodiment, the involved descriptions, such as, the request configuration information of the other system information and the request information of the other system information are consistent with the above embodiments, which will not be repeated here.

From the above description of the embodiments, those skilled in the art may clearly understand that the methods according to the above embodiments may be implemented by means of software plus necessary general-purpose hardware platforms, of course, it may also be implemented by means of hardware, but in many cases the former is an embodiment. Based on this understanding, the present application may be embodied in the form of a software product, which is stored in a storage medium (e.g., a read only memory (ROM)/random access memory (RAM), a magnetic disk, an optical disk) and includes several instructions to cause a terminal device (e.g., a mobile phone, a computer, a server, a network device, etc.) to perform the methods described in various embodiments of the present application.

This embodiment provides an information transmission device, which is used to realize the above-mentioned embodiments and further embodiments, and will not be repeated since it has already been described. As used below, a term of "module" may be a combination of software and/or hardware to implement a predetermined function. Although the devices described in following embodiments may be implemented in software, implementation of hardware, or a combination of software and hardware, is also possible and contemplated.

Figure 9:
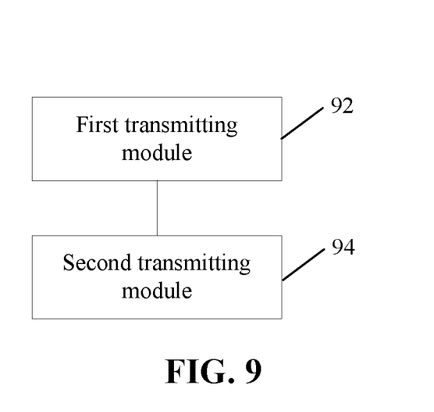
FIG. 9 is structural block diagram one of an information transmission device according to an embodiment of the present application.

FIG. 9 is a block diagram one of an information transmission device according to an embodiment of the present application, the device is applied to a network side, as shown in FIG. 9, the device includes a first transmitting module 92 and a second transmitting module 94.

The first transmitting module 92 is configured to transmit request configuration information of other system information, where the request configuration information of the other system information includes a transmission configuration for request information of other system information; the request information of the other system information is information transmitted to the network side, when the terminal requests to acquire the other system information.

The second transmitting module 94 is configured to transmit the other system information at a downlink transmission port indicated by the request information of the other system information.

It should be noted that, the request configuration information of the other system information involved in the present embodiment is configured through one of remaining minimum system information or a dedicated RRC signaling.

Furthermore, the request information of the other system information in the present embodiment is a preamble sequence transmitted on at least one preamble resource predefined in a system; where the preamble resource includes at least one of a time domain resource, a frequency domain resource, or a code domain resource. Therefore, when the other system information is divided into at least one type, one of the at least one preamble resource corresponds to one of the at least one type of the other system information.

In some embodiments, the device may further include an identification module 96, the identification module 96 is coupled with the second transmitting module and is configured to identify the downlink transmission port and a type of the other system information requested by the terminal in the request information of the other system information.

Besides, in another optional embodiment of the present embodiment, the request configuration information of the other system information involved in the present embodiment further includes at least one of: a transmission periodicity of each type of the other system information, a transmission time window of the other system information, a frequency domain position of the other system information, transmission resource information of the other system information, whether the other system information has been transmitted on a transmission resource, or a type of transmitted other system information.

Based on the above request configuration information of other system information, the second transmitting module 94 in the present embodiment is further configured to transmit the other system information to the terminal according to a transmission periodicity of the other system information, the transmission time window of the other system information, and the frequency domain position of the other system information on the downlink transmission port indicated by the request information of the other system information.

According to another alternative embodiment of the present embodiment, the request configuration of other system information involved in the preset embodiment further includes a receiving configuration of a RAR. Based on the above, the second transmitting module 94 in the present embodiment is further configured to transmit the other system information contained in the RAR.

Where, the random access response includes at least one of: a transmission periodicity of the other system information, a transmission time window of the other system information, a frequency domain position of the other system information, transmission resource information of the other system information, or a type of transmitted other system information.

Based on the above random access response, the second transmitting module 94 in the present embodiment is further configured to transmit the other system information according to the transmission periodicity of the other system information, the transmission time window of the other system information, and the frequency domain position of the other system information.

It should be noted that each of the above modules may be implemented by software or hardware, and the latter may be implemented in following methods, but is not limited thereto: the above modules are all located in a same processor; in some embodiments, the above modules may be located in different processors in any combination. In addition, this embodiment is a device embodiment corresponding to the method embodiment one.

Figure 10:
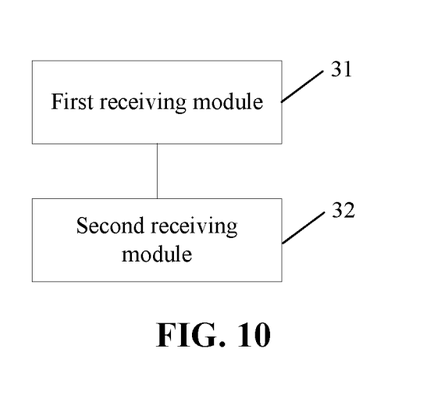
FIG. 10 is structural block diagram two of an information transmission device according to an embodiment of the present application.

FIG. 10 is a block diagram two of an information transmission device according to an embodiment of the present application, the device is applied to a terminal side, as shown in FIG. 10, the device includes a first receiving module 31 and a second receiving module 32.

The first receiving module 31 is configured to receive request configuration information of other system information transmitted by a network side; where the request configuration information of the other system information includes a transmission configuration for request information of the other system information; the request information of the other system information is information transmitted to the network side, when the terminal requests to acquire the other system information.

The second receiving module 32 is configured to receive the other system information transmitted by the network side on a downlink transmission port indicated by the request information of the other system information.

According to another embodiment of the present application, a storage medium is further provided, the storage medium includes a stored program, the program performs any one of the above method, when the program is executed.

In some embodiments, the storage medium may be configured to store a program code for executing following steps:

S1, request configuration information of other system information is transmitted to the terminal; where, the request configuration information of the other system information includes a transmission configuration for request information of the other system information; the request information of the other system information is information transmitted to the network side, when the terminal requests to acquire the other system information;

S2, the other system information is transmitted on a downlink transmission port indicated by the request information of the other system information;

In some embodiments, the above storage medium may include, but is not limited to, a U disk, a ROM, a RAM, a removable hard disk, a magnetic disk or an optical disk, and other various media that may store program codes.

According to another embodiment of the present application, a processor is further provided, the processor is used to execute a program, the program performs any step of the above methods, when the program is executed.

In some embodiments, the program may be configured to execute following steps:

S1, request configuration information of other system information is transmitted to the terminal; where, the request configuration information of the other system information includes a transmission configuration for request information of the other system information; the request information of the other system information is information transmitted to the network side, when the terminal requests to acquire the other system information;

S2, the other system information is transmitted on a downlink transmission port indicated by the request information of the other system information;

Obviously, those skilled in the art should understand that the above-mentioned modules or steps of the present application may be implemented by a general-purpose computing device, those modules or steps may be concentrated on a single computing device, or distributed in a network consisted of multiple computing devices. In some embodiments, they may be implemented by program codes executable by a computing device, so that they may be stored in a storage device for execution by a computing device, and in some cases, the steps shown or described may be performed in a sequence different from that herein, or they may be separately fabricated into individual integrated circuit modules, in some embodiments, multiple modules or steps among them may be fabricated into a single integrated circuit module. So, the present disclosure is not limited to any specific combination of hardware and software.

The above description is only some embodiments of the present disclosure and is not intended to limit the present disclosure, various modifications and changes may be made to the present disclosure for those skilled in the art. Any modification, equivalent substitution, improvement, and so on made within spirits and principles of the present disclosure shall be included within the protection scope of the present disclosure.

INDUSTRIAL APPLICABILITY

Using the embodiments of the present application, a network side transmits request configuration information of other system information to a terminal; where, the request configuration information of the other system information includes a transmission configuration for request information of the other system information; the request information of the other system information is information transmitted to the network side, when the terminal requests to acquire the other system information; so that the network side transmits the other system information on a downlink transmission port indicated by the request information of the other system information; it may be seen that the network side can effectively transmit the other system information to the terminal side.

What is claimed is:

1. An information transmission method, comprising:
transmitting, by a network side, request configuration information of other system information to a terminal; wherein the request configuration information of the other system information comprises a transmission configuration for request information of the other system information and an indication of whether the other system information has been transmitted on a transmission resource; the request information of the other system information is information transmitted to the network side in a case of the terminal requesting to acquire the other system information; and
transmitting, by the network side, a physical downlink shared channel (PDSCH) carrying the other system information.

2. The method according to claim 1, wherein the request configuration information of the other system information is configured through one of remaining minimum system information or a dedicated radio resource control (RRC) signaling.

3. The method according to claim 1, wherein the request information of the other system information is a preamble sequence transmitted on at least one preamble resource predefined in a system; wherein the preamble resource comprises at least one of:
a time domain resource, a frequency domain resource, or a code domain resource.

4. The method according to claim 3, wherein the other system information is divided into at least one type; wherein one of the at least one preamble resource corresponds to one of the at least one type of the other system information.

5. The method according to claim 1, wherein
the request configuration information of the other system information further comprises at least one of: a transmission periodicity of each type of the other system information, a transmission time window of the other system information, a frequency domain position of the other system information, transmission resource information of the other system information, or a type of transmitted other system information.

6. The method according to claim 1, wherein
the request configuration information of the other system information further comprises a receiving configuration of a random access response (RAR).

7. The method according to claim 6, wherein transmitting, by the network side, the request configuration information of the other system information to the terminal comprises:
transmitting, by the network side, the other system information contained in the RAR.

8. The method according to claim 6, wherein,
the random access response comprises at least one of: a transmission periodicity of the other system information, a transmission time window of the other system information, a frequency domain position of the other system information, transmission resource information of the other system information, or a type of transmitted other system information.

9. The method according to claim 8, comprising:
transmitting, by the network side, the other system information according to the transmission periodicity of the other system information, the transmission time window of the other system information, and the frequency domain position of the other system information.

10. An information transmission method, comprising:
receiving, by a terminal, request configuration information of other system information transmitted by a network side; wherein the request configuration information of the other system information comprises a transmission configuration for request information of the other system information and an indication of whether the other system information has been transmitted on a transmission resource; the request information of the other system information is information transmitted the network side in a case of the terminal requesting to acquire the other system information; and
receiving, by the terminal, a physical downlink shared channel (PDSCH) carrying the other system information and transmitted by the network side.

11. The method according to claim 10, wherein
the request configuration information of the other system information further comprises at least one of: a transmission periodicity of each type of the other system information, a transmission time window of the other system information, a frequency domain position of the other system information, transmission resource information of the other system information, or a type of transmitted other system information.

12. An information transmission device, comprising:
a processor; and
a memory for storing instruction executable by the processor,
wherein when executing the instructions, the processor is configured to:
transmit request configuration information of other system information, wherein the request configuration information of the other system information comprises a transmission configuration for request information of other system information and an indication of whether the other system information has been transmitted on a transmission resource; the request information of the other system information is information transmitted to the network side in a case of the terminal requesting to acquire the other system information; and
transmit a physical downlink shared channel (PDSCH) carrying the other system information.

13. The device according to claim 12, wherein
the request configuration information of the other system information further comprises at least one of: a transmission periodicity of each type of the other system information, a transmission time window of the other system information, a frequency domain position of the other system information, transmission resource information of the other system information, or a type of transmitted other system information.

14. The device according to claim 12, wherein the request configuration information of the other system information is configured through one of remaining minimum system information or a dedicated radio resource control (RRC) signaling.

15. The device according to claim 12, wherein the request information of the other system information is a preamble sequence transmitted on at least one preamble resource predefined in a system; wherein the preamble resource comprises at least one of:
a time domain resource, a frequency domain resource, or a code domain resource.

16. The device according to claim 15, wherein the other system information is divided into at least one type; wherein one of the at least one preamble resource corresponds to one of the at least one type of the other system information.

17. The device according to claim 12, wherein the request configuration information of the other system information further comprises a receiving configuration of a random access response (RAR).

18. The device according to claim 17, wherein the processor is configured to transmit request configuration information of other system information by:
   transmitting, by the network side, the other system information contained in the RAR.

19. An information transmission device, comprising:
   a processor; and
   a memory for storing instruction executable by the processor,
   wherein when executing the instructions, the processor is configured to implement the information transmission method according to claim 10.

20. A non-transitory storage medium, comprising a stored program, wherein the program, when executed, performs the method according to claim 1.

* * * * *

UNITED STATES PATENT AND TRADEMARK OFFICE
CERTIFICATE OF CORRECTION

PATENT NO. : 11,323,951 B2
APPLICATION NO. : 16/622861
DATED : May 3, 2022
INVENTOR(S) : Xing Liu et al.

It is certified that error appears in the above-identified patent and that said Letters Patent is hereby corrected as shown below:

In the Claims

Claim 10, at Column 22, Line 11, delete "transmitted the network" and replace with -- transmitted to the network --

Signed and Sealed this
Thirty-first Day of May, 2022

*Katherine Kelly Vidal*
Director of the United States Patent and Trademark Office